UNITED STATES PATENT OFFICE.

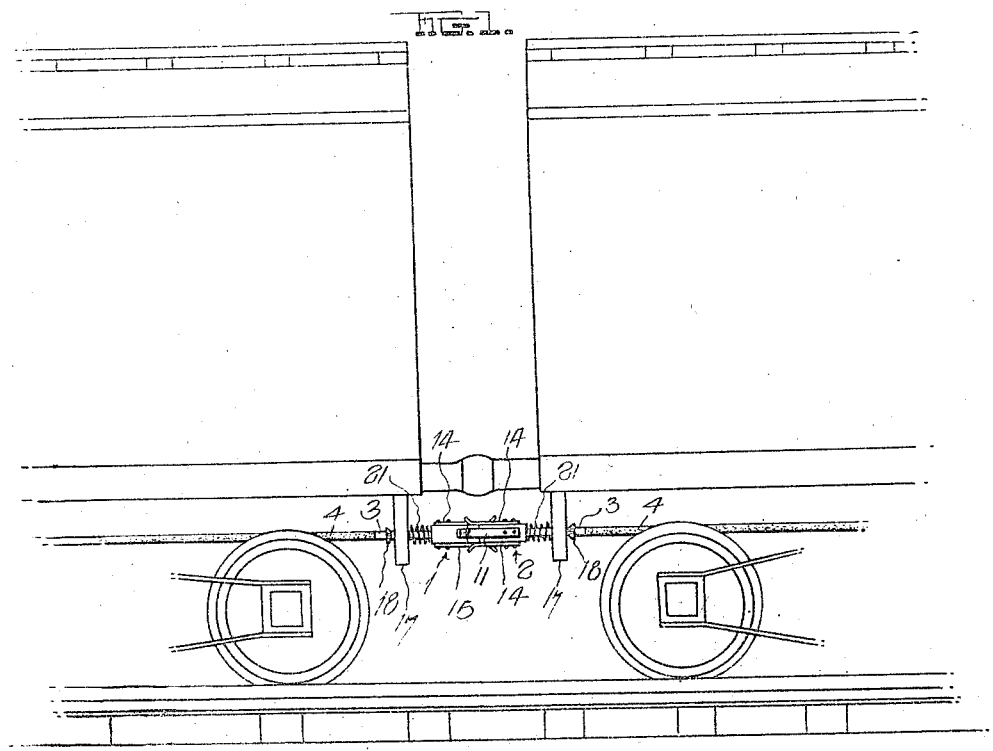

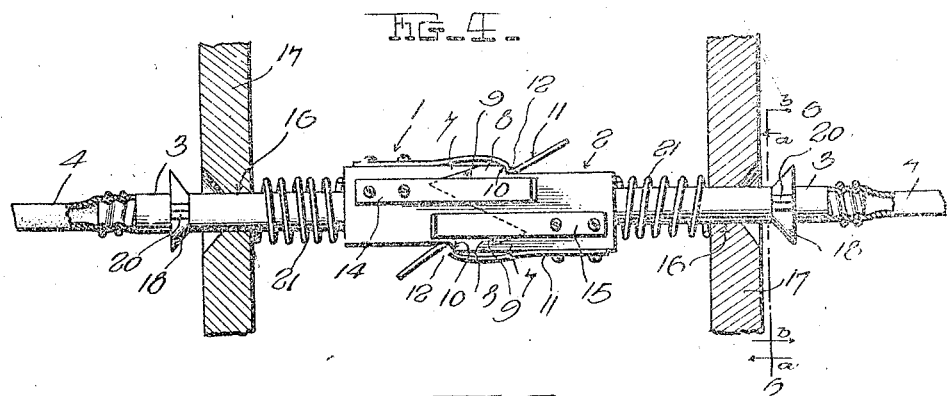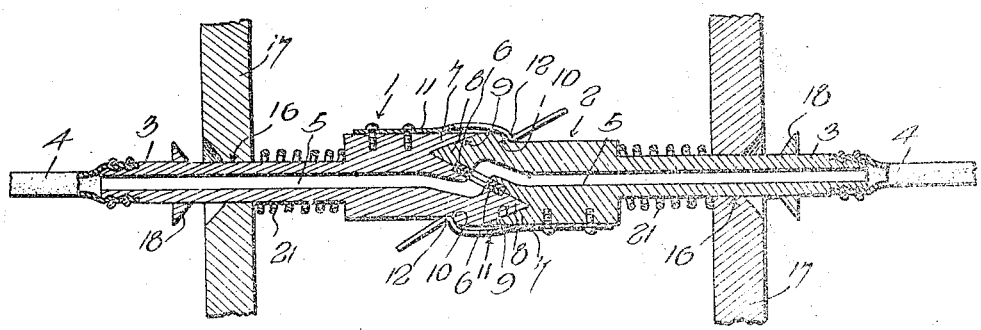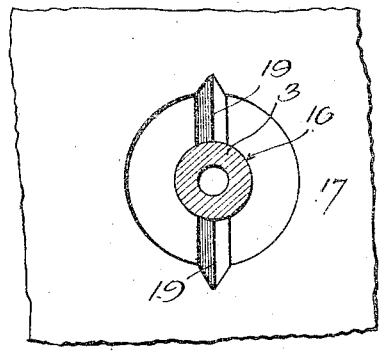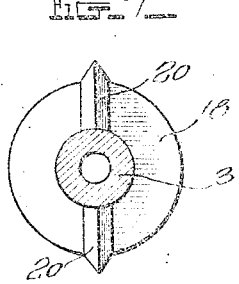

HENRY C. DUTY AND LEROY L. CRAIG, OF PITTSBURG, ILLINOIS.

AIR-PIPE COUPLING.

1,220,503.

Specification of Letters Patent.   Patented Mar. 27, 1917.

Application filed August 14, 1916.   Serial No. 114,858.

*To all whom it may concern:*

Be it known that we, HENRY C. DUTY and LEROY L. CRAIG, citizens of the United States, residing at Pittsburg, in the county of Williamson and State of Illinois, have invented certain new and useful Improvements in Air-Pipe Couplings; and I do declare the following to be a full, clear, and exact description of the invention, such as will enable others skilled in the art to which it appertains to make and use the same.

This invention relates to improvements in couplings for detachably connecting the pipes of an air brake system.

The main object of the invention is to provide a simple and efficient coupling of this character which is so constructed as to unite the air pipes with two cars in air tight relation and the members of which when connected will be reliably held in operative position.

Another object is to produce a device of this character constructed to provide for wear and yet retain the parts in air tight relation.

Still another object is to provide resilient guides for directing the heads of the respective members into operative engagement and to provide for a slight vertical relative movement of said heads without danger of them separating.

Another object is to provide combined guiding and locking elements carried by the respective heads, the guiding and locking element of one head engaging a coöperating locking element of the other head.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation showing a portion of two cars connected and with this improved coupler applied;

Fig. 2 is a side elevation showing the coupler heads of this invention separated and arranged in juxtaposition ready for connection, the bumper boards being shown in section;

Fig. 3 is a plan view thereof;

Fig. 4 is a plan view showing the coupler in connected operative position;

Fig. 5 is a vertical section thereof;

Fig. 6 is a transverse vertical section taken on the line 6—6 of Fig. 4 looking in the direction of the arrow *a*;

Fig. 7 is a similar view looking in the direction of the arrow *b*.

In the embodiment illustrated two coupler heads 1 and 2 are shown adapted to confront each other and be connected, said heads having tubular extensions 3 at their rear ends each provided with a hose section 4 for connection with the air line.

The heads 1 and 2 are identical in construction and therefore one only will be described in detail. The coupler head 1 which is connected with the usual air brake pipe of the car through the medium of the flexible connection 4 has located therein and communicating with its hose connection an air passage or conduit 5, the orifice of which is arranged in a horizontal plane at the front end of the head and provided with the usual rubber gasket 6 seated therein for effecting the proper coupling of the conduit with that of a companion coupler head when brought into coupling engagement therewith.

The front end of the head 1 is bifurcated, the furcations or noses 7 and 8 thereof being of different lengths and different widths with their inner faces converging toward their inner ends, the inclination of the longer wider nose 8 being much more abrupt than that of the shorter furcation or nose 7 and this furcation 8 has its outer face beveled or inclined as shown at 9 to conform to the inclination of the inner face of furcation 7 of the other head so that when the heads are brought into coupling engagement, the outer faces of the two heads will be flush with each other. This formation of the furcations provides a substantially V-shaped recess at the front end of each head disposed nearer one side of the head than the other and into which the branch 8 of the other head fits.

These heads 1 and 2 have shoulders 10 spaced rearwardly from the inclined faces 9 of the branches 8 thereof which are designed to coöperate with a combined guide and locking element 11 carried by the other head on the outer face of its branch 7. These locking elements 11 are constructed of resilient steel strips fixed at one end to the outer face of the furcation 7 and having its free end offset inwardly at a point beyond the free end of said furcation with the terminal of said strip deflected outwardly to facilitate the engagement of the heads. This offset 12 forms a catch for engaging the shoulder 10 of the other head as is shown clearly in Figs. 4, 5 whereby when the heads are brought into coupling engagement they are locked against accidental separation.

Each of the heads 1 and 2 is provided on its upper and lower face with guiding arms 14 and 15 arranged adjacent one edge thereof and disposed substantially in vertical alinement with their free ends projecting beyond the front end of the head to which they are attached and flared outwardly to facilitate and guide the other head in its coupling movement. The arms on the head 1 are arranged adjacent one side edge of said head while those on the head 2 are arranged adjacent the opposite side edge so that when these heads are brought into coupling engagement, the arms on one head will lie parallel with those on the other as is shown clearly in Fig. 4. These arms 14 and 15 are preferably constructed of sheet steel and while exerting a clamping engagement to hold the heads in coupled relation, they are sufficiently elastic to permit said heads to have a slight vertical movement to prevent all possibility of breakage occasioned by unevenness of the track over which the train may be passing.

The tubular extensions 3 of the heads 1 and 2 are slidably mounted in apertures 16 formed in bumper boards 17 carried by the car to which this device is applied, it being understood that these coupler heads are arranged below and in advance of the ordinary car couplers. Each bumper board 17 has its rear face beveled around the aperture 16 therein to form a seat for a coöperating washer or plate 18 carried by the extension or shank 3 of the coupler head which is mounted on said board. Notches 19 are also formed in the seat and are designed to receive lugs 20 when the cars are in uncoupled position and thereby prevent the coupling heads from turning so that when the cars are brought together these heads will be held ready for coupling engagement.

A coiled spring 21 is mounted on the extension 3 of each coupler head between the front face of the bumper board 17 and the rear end of the head and exerts its tension to normally force said head into projected position ready for engagement by the companion head on an adjacent car to be coupled. This spring also operates as a buffer when the cars are brought into coupling engagement. This spring also operates to hold the washer in locking engagement with the notched seat on the bumper board 17.

In the use of this improved coupler when the parts are in the position shown in Figs. 2, 3 the cars being brought together will cause the branches 8 of the respective heads to engage the recess in the head, the guiding arms 14 and 15 serving to direct them into operative engagement and the combined guiding and locking arms 11 pass over the lugs or shoulders 10 and securely hold the heads in coupled position. When these heads are brought into this position, the orifices of the air conduits 5 of the respective heads will register with each other and being provided with the gasket 6 will have an air tight connection so that the air will pass freely through the system from one car to the other.

When the cars are uncoupled in the usual manner and drawn apart the locking arms 11 will yield and permit the coupler heads 1 and 2 to readily separate. Immediately this separation occurs, the springs 21 operate to force the heads forward and to bring the washers 18 into locking engagement with the notches of the bumper board 17 and thus hold said heads ready for the next coupling of the cars.

We claim:

In a coupler of the class described, a pair of coupler heads having longitudinally extending interlocking elements provided with air conduits having outlet orifices, the orifice of one head being positioned to register with that of the other when in operative engagement, each head having forwardly projecting spring fingers, those on one head yieldingly engaging the other head, each head having a finger on one face with a catch at its free end and a shoulder on its opposed face, the catch of one head engaging the shoulder of the other when in operative position, the other two opposed faces of each head each having a longitudinally extending spring finger arranged adjacent one edge whereby when said heads are engaged, the fingers of one head will be in parallel relation with those of the other head.

In testimony whereof we have hereunto set our hands in the presence of two subscribing witnesses.

HENRY C. DUTY.
LEROY L. CRAIG.

Witnesses:
  MILES DAVIS,
  J. G. WALKER.